United States Patent
Shaffer et al.

(10) Patent No.: US 6,775,247 B1
(45) Date of Patent: Aug. 10, 2004

(54) REDUCING MULTIPOINT CONFERENCING BANDWIDTH

(75) Inventors: Shmuel Shaffer, Palo Alto, CA (US); William J. Beyda, Cupertino, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/273,596

(22) Filed: Mar. 22, 1999

(51) Int. Cl.[7] .......................... H04L 12/16; H04Q 11/00
(52) U.S. Cl. ................... 370/260; 348/14.08; 709/204
(58) Field of Search ................................. 370/260, 261, 370/262, 263, 264, 265, 266, 267, 268; 348/14.08, 14.09, 14.02; 709/204, 205

(56) References Cited

U.S. PATENT DOCUMENTS

| | | | |
|---|---|---|---|
| 5,563,882 A | | 10/1996 | Bruno et al. |
| 5,680,392 A | | 10/1997 | Semaan |
| 5,684,527 A | | 11/1997 | Terui et al. |
| 5,710,491 A | | 1/1998 | Takagi et al. |
| 5,729,532 A | | 3/1998 | Bales et al. |
| 5,801,756 A | * | 9/1998 | Iizawa ...................... 348/14.11 |
| 5,818,513 A | | 10/1998 | Sano et al. |
| 5,841,763 A | | 11/1998 | Leondires et al. |
| 6,288,740 B1 | * | 9/2001 | Lai et al. ................. 348/14.08 |
| 6,332,153 B1 | * | 12/2001 | Cohen ......................... 709/203 |
| 6,421,706 B1 | * | 7/2002 | McNeill et al. ............. 709/204 |

* cited by examiner

Primary Examiner—Bob A. Phunkulh

(57) ABSTRACT

A method, apparatus and communication system for efficiently and economically supporting a multipoint videoconference call is described. The multimedia conference unit determines which communication unit is a dominant communication unit, with the other communication units being thus determined to be subordinate communication units. The multimedia conference unit then commands the subordinate communication units to suppress a video portion of their respective signals, such that the digital signal processing analysis by the multimedia conference unit required to support the multipoint conference is reduced and network bandwidth used is minimized.

21 Claims, 10 Drawing Sheets

REDUCING MULTIPOINT CONFERENCING BANDWIDTH

BACKGROUND OF THE INVENTION

The invention generally relates to the fields of communication systems and videoconferencing. More particularly, the invention is directed to methods and apparatus for reducing the bandwidth required to conduct a multipoint conference.

Telephone conferencing systems have been available for many years. These systems have primarily focused on providing audio conferencing. A typical conference includes a group of individuals who are telephonically connected into a discussion by an operator at a central locality. In recent years, however, the addition of video capabilities has greatly increased the bandwidth required to establish a multipoint audio-video conference.

By way of example, FIG. 1A illustrates a conventional network 10 for conducting an audio-video multipoint conference. The network 10 includes multiple personal conferencing systems (in this example, PCS 12a, PCS 12b, PCS 12c and PCS 12d) as well as a multimedia conference unit (MCU) 14 that is coupled to PCSs 12a–12d. In the situation where the PCSs 12a–12d are coupled over a local area network (LAN), the network 10 is illustrative of a conventional telephony-over-LAN (ToL) network. A PCS may be a video telephone, telephony-enabled computer, and/or portable device able to send and receive to each other directly via network 10, which may be a LAN or a wireless network.

Generally, the MCU 14 is capable of joining PCSs 12a–12d (ToL users in this specific example) in multipoint videoconferences. During a typical multipoint videoconference, the MCU 14 receives all video and audio signals from the participating PCSs and typically re-transmits the mixed audio signals of participating PCSs and the video signal originating from the dominant or presenting PCS to all participating PCSs, including the presenter. As seen in the example of FIG. 1A (which does not show audio signals but only shows video signals for simplicity), supposing PCS 12a is the presenter, the MCU 14 receives the audio signals and video signals from all PCSs 12a–12d, determines PCS 12a to be dominant, and then re-broadcasts the mixed audio signals and video signals originally from PCS 12a to PCSs 12a–12d. In this example, eight video connections (video signals 15a–15d from PCSs 12a–12d to MCU 14, and video signals 16a–19a from MCU 14 to PCSs 12a–12d, where video signals 16a–19a carry the video signals 15a sent from PCS 12a to MCU 14) between the MCU 14 and the PCSs 12a–12d via LAN hub 17 are required. This conventional system requires the MCU 14 to perform high level digital signal processing (DSP) of the multiple received and transmitted audio and video signals between all parties and MCU 14 involved in the videoconference. This high level of DSP analysis results in the MCU 14 being very expensive compared to an audio-only MCU, which is comparatively simple and inexpensive. Moreover, the use of eight video streams in addition to the audio connections normally used (not shown in FIG. 1A) results in heavy use of network bandwidth.

Another conventional approach to videoconferencing utilizes an MCU 14 capable of providing a multicast stream, as shown in the example of FIG. 1B. In the example of FIG. 1B (which does not show audio signals but only shows video signals for simplicity), supposing PCS 12a is presenting, MCU 14 receives the audio signals and video signals from all PCS 12a–12d, determines PCS 12a to be dominant, and then re-transmits the mixed audio signals and the video signals from PCS 12a to PCS 12b–12d in a multicast stream. In this example, the required video streams are reduced to five video streams (video signals 15a–15d from PCSs 12a–12d to MCU 14, and video multicast signal 20a from MCU 14 to PCSs 12b–12d, where video multicast signal 20a carries the video signals 15a originally sent from PCS 12a to MCU 14) between the MCU 14 and the PCSs 12a–12d via LAN hub 17, when the presenter PCS 12a views its own presentation. It should be noted that in those cases where the presenter PCS 12a wishes to view someone else's presentation, an additional video stream (15b, shown in FIG. 1B as a dotted arrow from MCU 14 to LAN hub 17, where the dotted arrow 15b carries the video signal of a participant, e.g. PCS 12b, other than the presenter) from the MCU 14 to the PCS 12a via LAN hub 17 is required (and video 20a to PCS 12a would replace video 15b to PCS 12a), for a total of six video streams. Although the reduction in video streams from MCU multicast capability reduces the required DSP analysis somewhat, MCU 14 must still be capable of processing at least five video streams, which is still very expensive in comparison to an audio-only MCU.

In addition to requiring expensive processing power in the MCU 14, multiple audio and video streams for supporting the videoconference session require large network bandwidth resources, which may not be available in some circumstances when network traffic is heavy. Therefore, what is desired is an improved method and apparatus for reducing the bandwidth required to conduct a videoconference.

SUMMARY OF THE INVENTION

Broadly speaking, the invention relates to an improved method, apparatus and system for reducing the digital signal processing analysis required to support a multipoint conference call among a plurality of callers coupled via a network to a multimedia conference unit. The multimedia conference unit first determines which caller is a dominant caller, the other callers being subordinate callers. The multimedia conference unit then commands the subordinate callers to suppress a portion of their signals passed over the network. In some embodiments, the portion are video signals, and only the dominant caller transmits video signals to at least the subordinate callers either via the multimedia conference unit or directly to the subordinate callers, depending on whether point-to-point connection capability between callers exists.

In one embodiment, the callers pass audio signals and video signals over the network, and the multimedia conference unit uses the audio signals to determine which of the callers is dominant. In another embodiment, when the multimedia conference unit determines that the dominant caller has changed, the multimedia conference unit commands the previous dominant caller to stop sending video signals in the form of video packets and the new dominant caller, if not already sending video signals, to start sending video signals in the form of video packets.

These and other embodiments with advantages of the present invention will become apparent from the following detailed description and drawings.

DETAILED DESCRIPTION OF THE EMBODIMENTS

This invention is generally directed to a system for performing audio-video multipoint conferencing. More particularly, the present invention reduces the bandwidth required to carry out the audio-video multipoint conference by suppressing the transmission of video signals from the "listening" (or subordinate) users to the MCU and by utilizing video signals transmitted from the "speaking" (or dominant) user to the MCU, while maintaining the audio transmissions from all subordinate and dominant users to the MCU. The present invention utilizes much less network bandwidth with the resultant concomitant reduction in video MCU complexity and cost. In accordance with a specific embodiment of the present invention, the MCU continually samples the audio signals from the subordinate users to determine if any one of them is the dominant user and/or has "taken over" the presentation and therefore has become the dominant user. When so determined, the MCU enables a video stream between it and the dominant user to receive the dominant video signal from the dominant user and then distributes the dominant video signal to the other subordinate users. Thus, reduced video streams (from the users to the MCU) are required in an audio-video conference according to various specific embodiments of the present invention. In other specific embodiments with an MCU having multicast ability, the video streams needed can be further reduced. In still other specific embodiments, the MCU can set up the video signal as a multicast signal from the dominant user, thereby eliminating the need for the dominant user to send the signal to the MCU which re-sends it to the other users.

By having the dominant video signal and none of the subordinate video signals sent to the MCU, the resultant savings in bandwidth on the network, e.g., a LAN, is substantial. Similarly, fewer video streams to the MCU reduce the DSP analysis required, so that the cost and complexity of the MCU is also reduced.

Figure 1A:
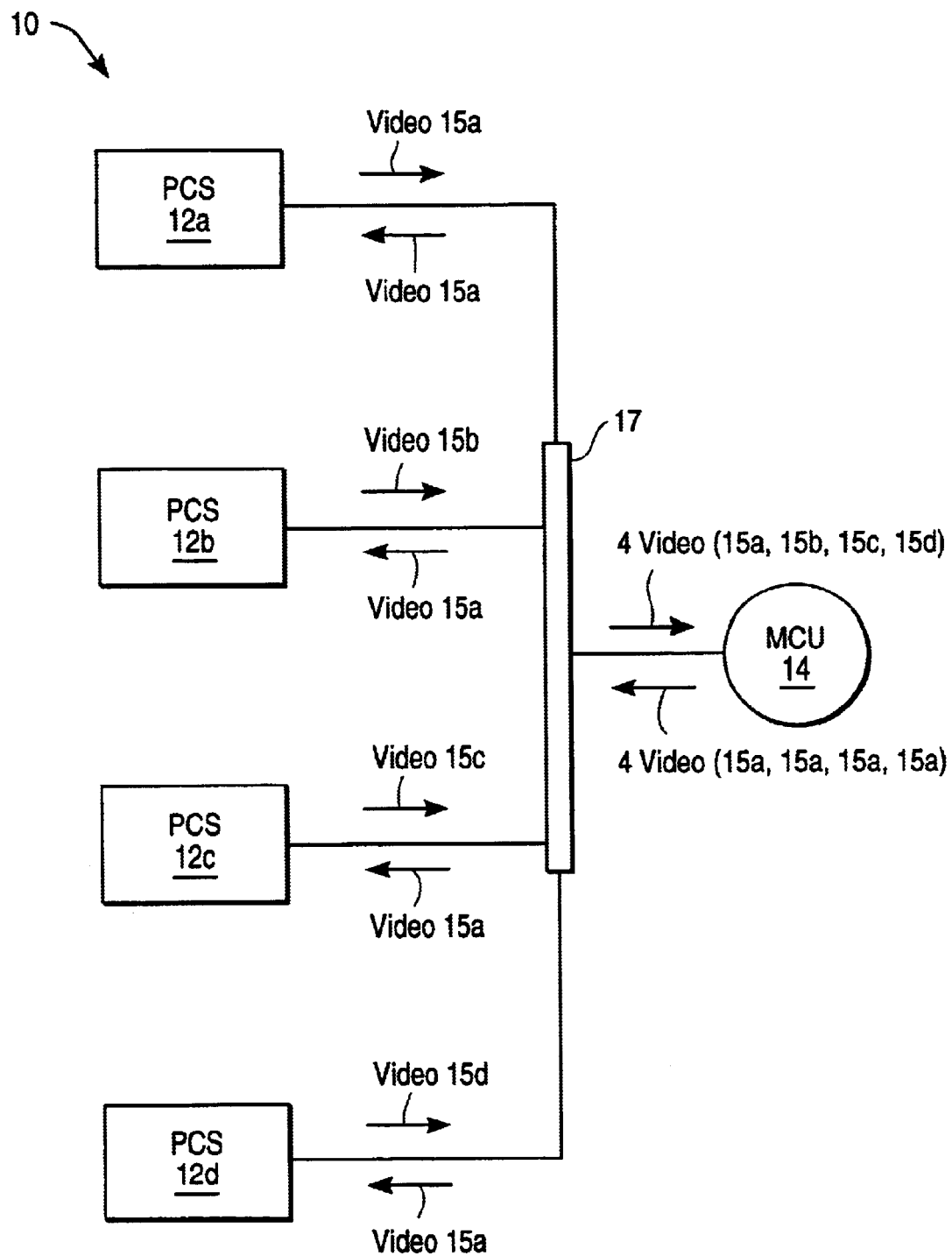
FIG. 1A is a conventional network illustrating the number of video streams required to conduct a multipoint videoconference.
Figure 1B:
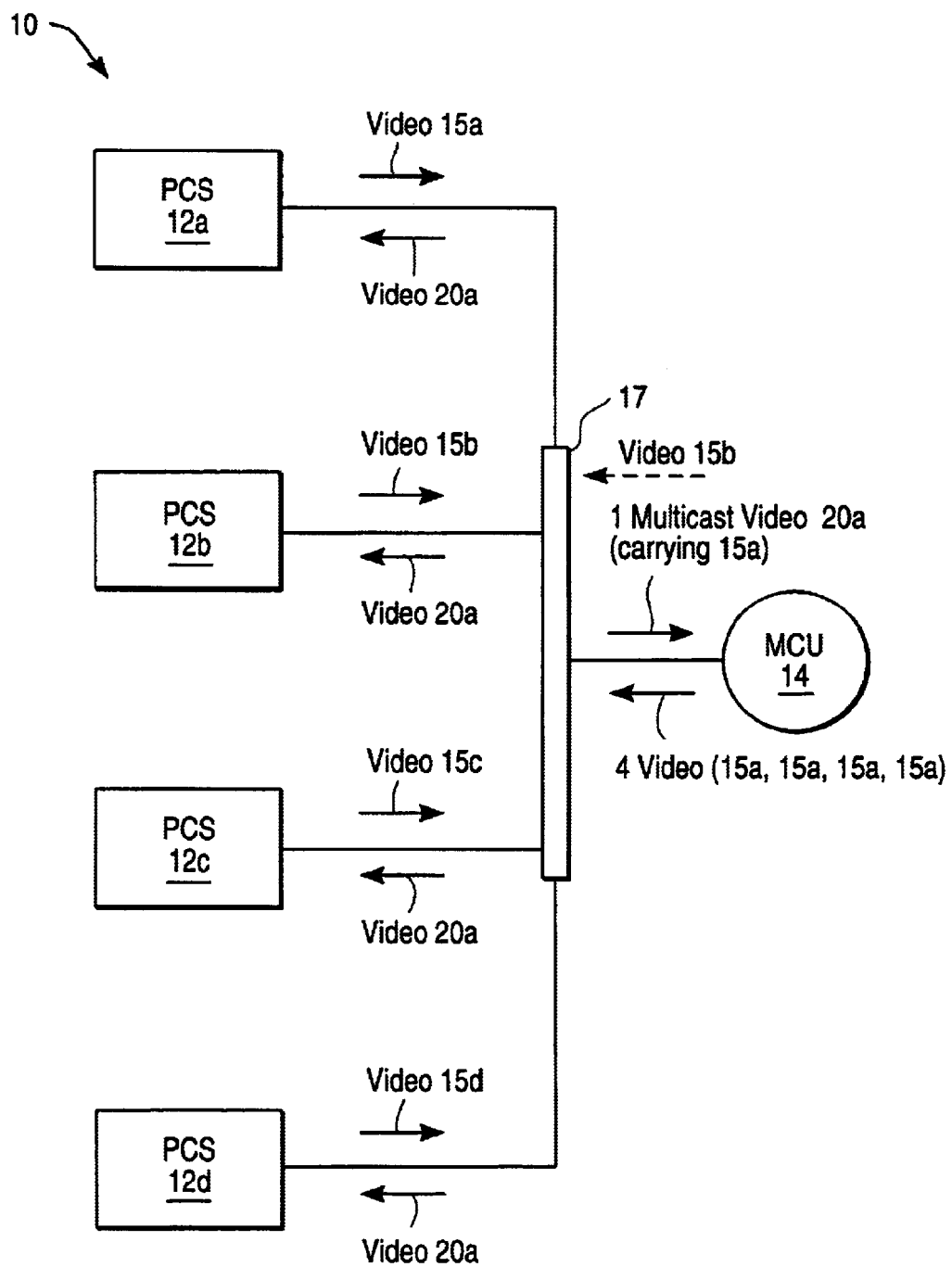
FIG. 1B illustrates the number of video streams required to conduct a multicast videoconference using the network shown in FIG. 1A.
Figure 2:
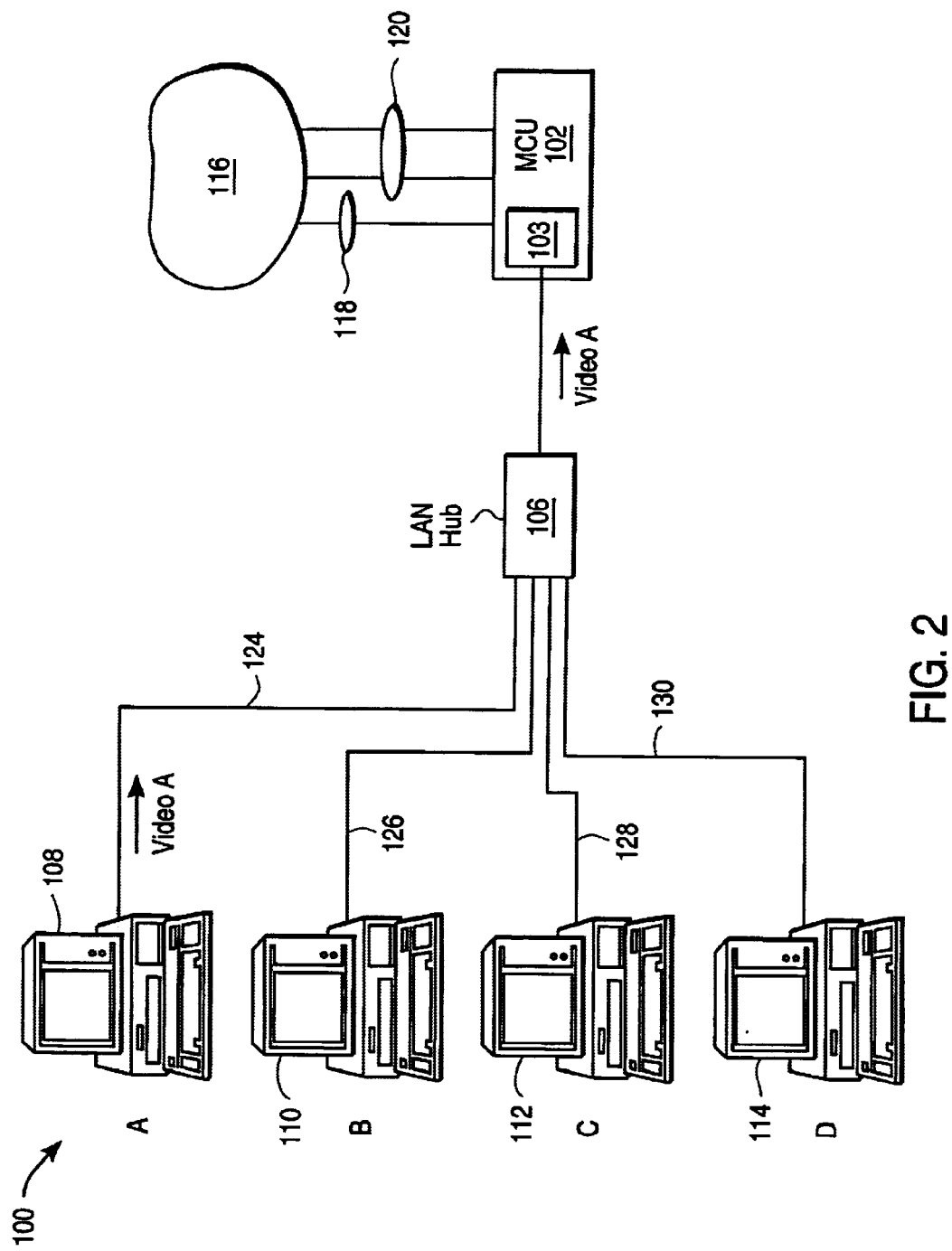
FIG. 2 is a ToL network in accordance with an embodiment of the invention.

The invention is described in the context of an audio-video multipoint conferencing system with telephony-enabled computers on a LAN, such as shown in FIG. 2. However, it should be noted that the invention can be used for other types of conferencing systems. Such other systems include wireless conferencing systems in which reduction in bandwidth is considered important.

Referring now to FIG. 2, a schematic block diagram of an audio-video multipoint conferencing system 100 of the type employed with specific embodiments of the invention, is shown. The system 100 is preferably an International Telecommunications Union (ITU)-Telephony Standardization Sector (TSS) compliant conferencing system. In a preferred embodiment, the network 100 supports ITU-recommended standards. For example, one such standard is the H.323 protocol that covers multimedia over non-guaranteed bandwidth packet switched networks. The Internet and LANs using TCP/IP and SPX/IPX protocols running over Ethernet or Token Ring are examples of packet switched networks with non-guaranteed bandwidth. The H.323 protocol is a set of protocols that sits on top TCP/IP and provides interoperability among different vendors and platforms of products for multimedia communication applications that will run over LANs and the Internet. The H.323 standard specifies call control, multimedia management, and bandwidth management for point-to-point and multipoint conferences. H.323 also specifies protocols and elements that allow communication among LANs and other networks such as the PSTN.

The system 100 includes a multimedia conferencing unit (MCU) 102 that includes a selector unit 103, a LAN hub 106, and four personal communication systems (PCS) 108, 110, 112 and 114. It should be noted that any number of PCSs can be employed in the system 100 and only four are shown for the sake of clarity.

The MCU 102 is one of the primary components of the system 100. It can connect to public or private networks 116 by way of communication links, such as an audio 118 and video 120 T1. A T1 communication link is a traditional telephone network trunk that provides twenty-four telephone channels. When the network interface is configured as a T1 interface, the MCU 102 can support audio-only information as well as a mix of audio and video information. The MCU 102 digitally interfaces with the PCSs 108–114 by way of the LAN hub 106. The operation and structure the LAN hub 106 are governed, for example, by IEEE 802. Each of the PCSs 108–114 includes an audio-video interface to enable the operators to see and hear conferees, as well as to be seen and heard by conferees. As stated above, MCU 102 includes a selector unit 103. In the described embodiment, the selector unit 103 is arranged to select, as desired, a dominant PCS.

In the described embodiment, each of the PCSs 108–114 supports hardware and software required to enable an operator to participate in a videoconference. This includes video cameras, microphones, along with the required encoding, decoding, and communications software and hardware. The operator of any of the PCSs 108–114 can establish and connect to a videoconference using a graphical user interface (GUI) displayed on the respective PCS. Once the connection is created, video from the operator's camera is encoded and then transmitted to the multimedia conference unit and current conference video can be transmitted to the PCSs 108–114.

In an audio-video conference, each conferee interfaces to the system 100 by way of their respective PCS that contains a video coder/decoder (codec) board. Audio-video conferences are set up according to the codec capabilities of the participating conferees or according to a minimum codec capability determined to be in effect for the conference. The capabilities for the conference can be fixed or variable. If a conferee cannot meet the capabilities established for the conference, that conferee can attend the conference in an audio mode only or the MCU 102 can step down the capabilities to allow the conferee to join the conference, automatically or by command.

Referring to FIG. 2, in order to set up an audio-video conference among clients A, B, C, and D operating the PCSs 108, 110, 112, and 114, respectively, each of the clients calls into the MCU 102 using standard H.323 call setup commands. In one specific embodiment of the invention, the MCU 102 arbitrarily selects the first client to dial in as the dominant client. For this example, suppose client A on the PCS 108 is determined to be the dominant client and that clients B, C, and D are subordinate clients. In response to the dialing in of the dominant client A, the MCU 102 sends H.323 commands to clients B, C, and D to stop sending video signals. The transmission of audio packets over links 126–130 from the PCSs 110–114 (associated with the clients B, C, and D, respectively) to the MCU 102 continues as normal. The transmission of video packets from subordinate PCSs 110–114 over the links 126–130 via LAN hub 106 to MCU 102 is thus suppressed. In this way, only link 124 is used to send video packets ("Video A" in FIG. 2) from the dominant PCS 108 to the MCU 102. Thus, the present invention reduces the video streams from all of the PCSs to MCU 102 down to one video stream only from the dominant PCS. The audio transmissions normally used for the audio-video conference are not changed with the present invention, but merely sampled to determine any changes in the dominant PCS based on audio dominance (therefore, the below Figs. do not show the audio signals but only show the video streams). In accordance with specific embodiments, the present invention can further reduce the number of total video streams established to the subordinate PCSs, as discussed below.

Figure 3A:
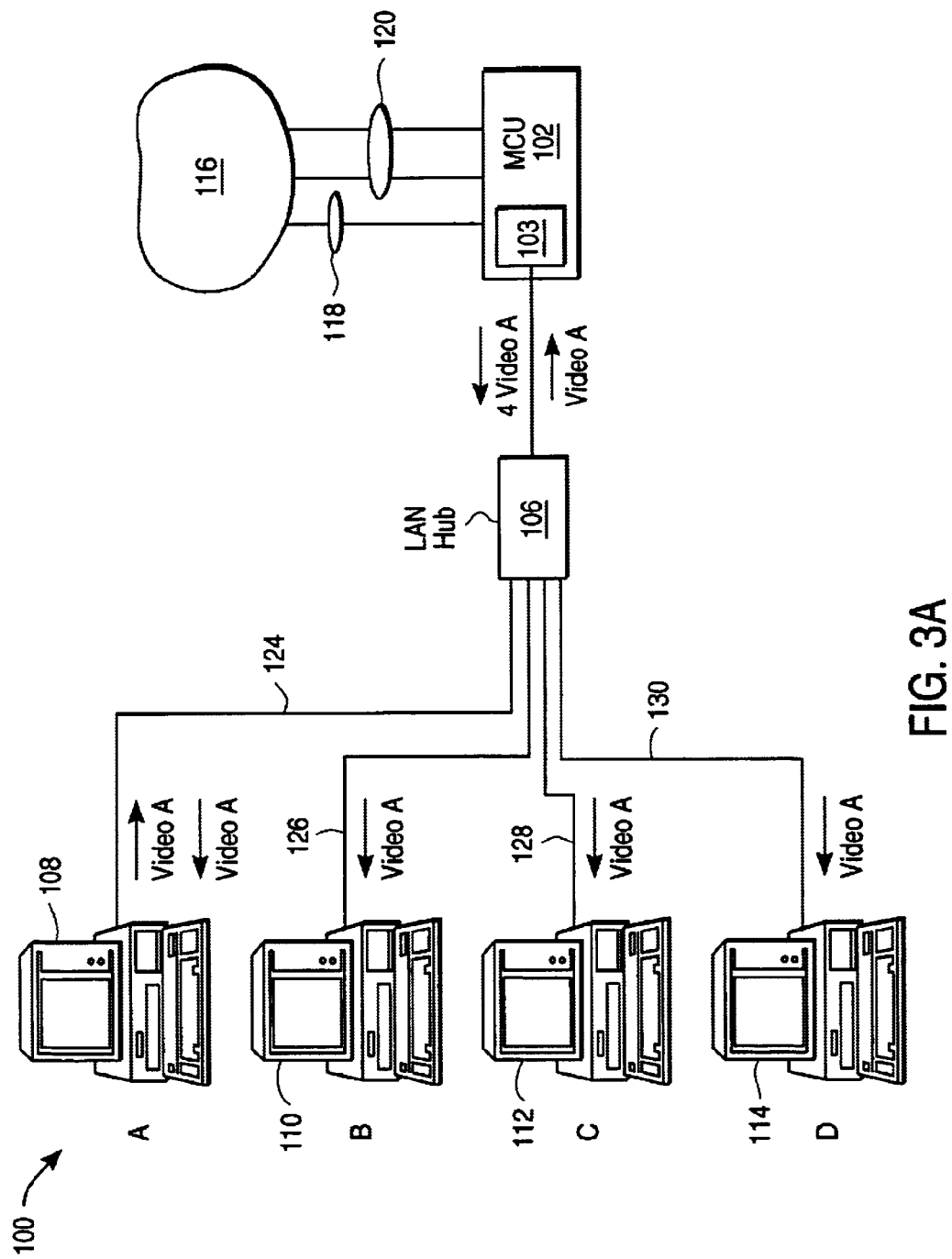
FIG. 3A is a ToL network with unicast streams, in accordance with an embodiment of the present invention.

FIG. 3A illustrates an audio-video multipoint conference using unicast streams, in accordance with an embodiment of the invention. After the dominant PCS video stream ("Video A" in FIG. 3A) is received by MCU 102, MCU 102 uses four video streams to clients A, B, C and D when MCU multicasting is not an option, for reasons related to, for example, network topology or architecture. In this situation, a total of five video streams between MCU 102 and clients A, B, C and D are required for the audio-video conference.

Figure 3B:
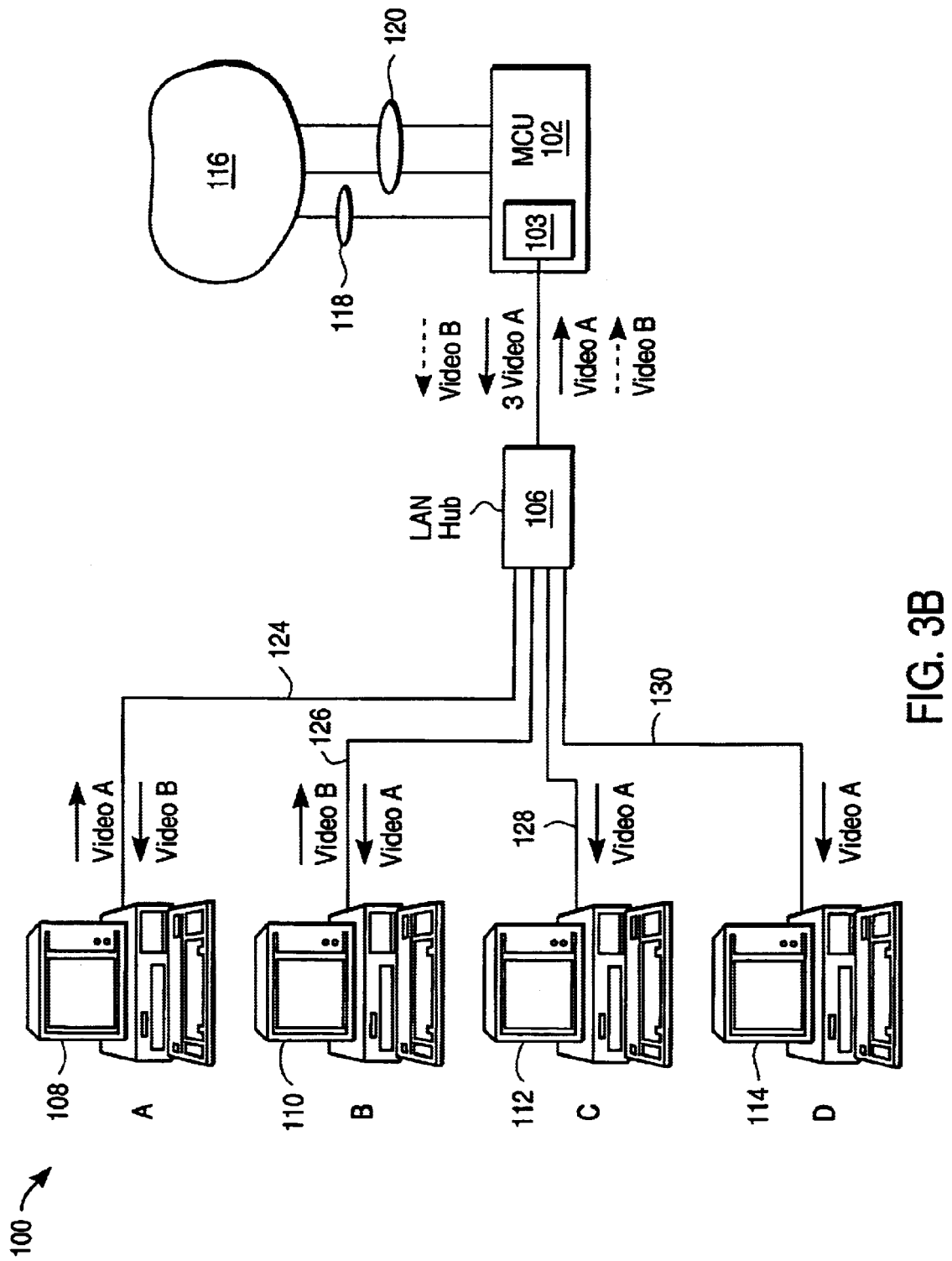
FIG. 3B is a ToL network with unicast streams, in accordance with embodiments of the present invention.

If client A would like to see another client, such as client B, instead of itself, then additional video streams from PCS 108 to MCU 102 and from MCU 102 to PCS 110 can be formed as shown by dotted line arrows labeled "Video B" between MCU 102 and LAN hub 106 in FIG. 3B, which illustrates other embodiments using unicast streams. In such situations, the dominant client A can see each of the conferees to which he is speaking rather than watch himself on his own monitor. In some embodiments where clients can have point-to-point connections to other clients, then at the beginning of a conference, the MCU 102 can randomly select one user for the current dominant speaker to view, and ask client B, for example, to begin sending video directly ("Video B" in FIG. 3B) to client A thereby bypassing the MCU 102, as illustrated in FIG. 3B by omitting the two dotted line arrows labeled "Video B".

In either case for FIG. 3B, as the conference progresses and different users "take over", the audio portion of the MCU 102 can remember the previously dominant speaker, and ask the previously dominant user to send a video stream to the current dominant speaker. In this way, the current speaker can view the previous speaker instead of his own face. People engaged in a back-and-forth discussion during a videoconference would be able to see each other's reactions while they are talking in this manner. In this situation where the dominant client desires to view another client, a total of six video streams (including dotted line arrows "Video B" for the scenario where the clients do not have point-to-point connection capability) or four video streams (omitting dotted line arrows "Video B" for the scenario where the clients do have point-to-point connection capability) between MCU 102 and clients is used.

Figure 4A:
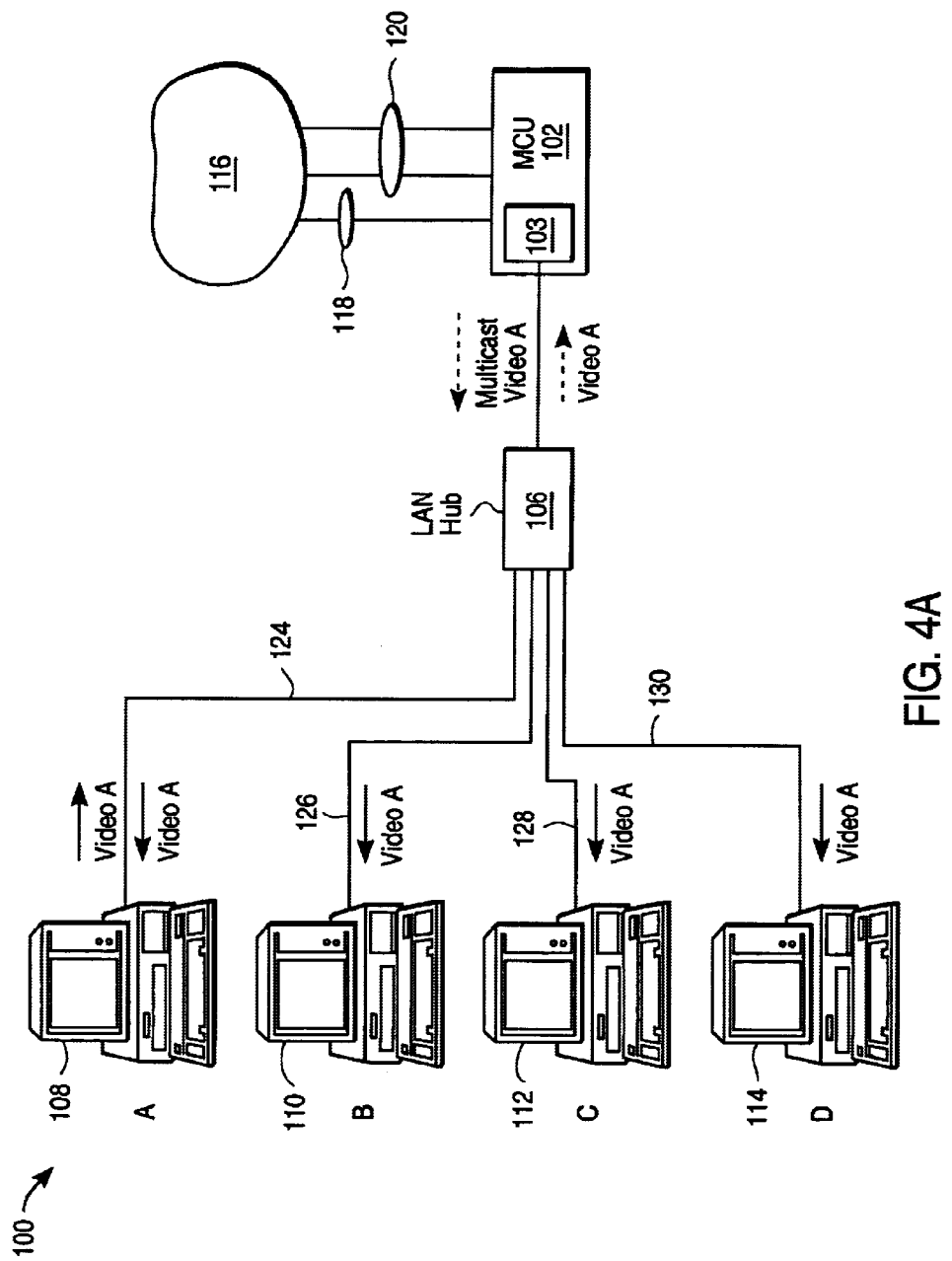
FIG. 4A is a ToL network with multicast streams, in accordance with alternate embodiments of the invention.

FIG. 4A illustrates an audio-visual conference with multicast ability, in accordance with other specific embodiments of the invention. After the dominant PCS video stream (dotted line arrow "Video A" from LAN hub 106 to MCU 102 in FIG. 4A) is received by MCU 102 and if MCU multicasting is available, MCU 102 sends a multicast "Video A" (dotted line arrow from MCU 102 to LAN hub 106) via LAN hub 106 to clients A, B, C and D. Thus, two video streams between MCU 102 and LAN hub 106 are needed. In embodiments where clients have the capability for point-to-point connections (in these embodiments, dotted line arrows "Video A" between MCU 102 and LAN hub 106 would be omitted from FIG. 4A), then MCU 102 informs dominant client A to send multicast video directly to clients A, B, C and D. MCU 102 also informs clients A, B, C, and D to begin receiving the multicast signal of the dominant client conferee (i.e., client A). Therefore, video packets from the dominant client A are sent directly to clients B, C, and D, without going through MCU 102. Only mixed audio packets (i.e., audio from all conferees) are sent from the MCU 102 to the clients A, B, C, and D.

Figure 4B:
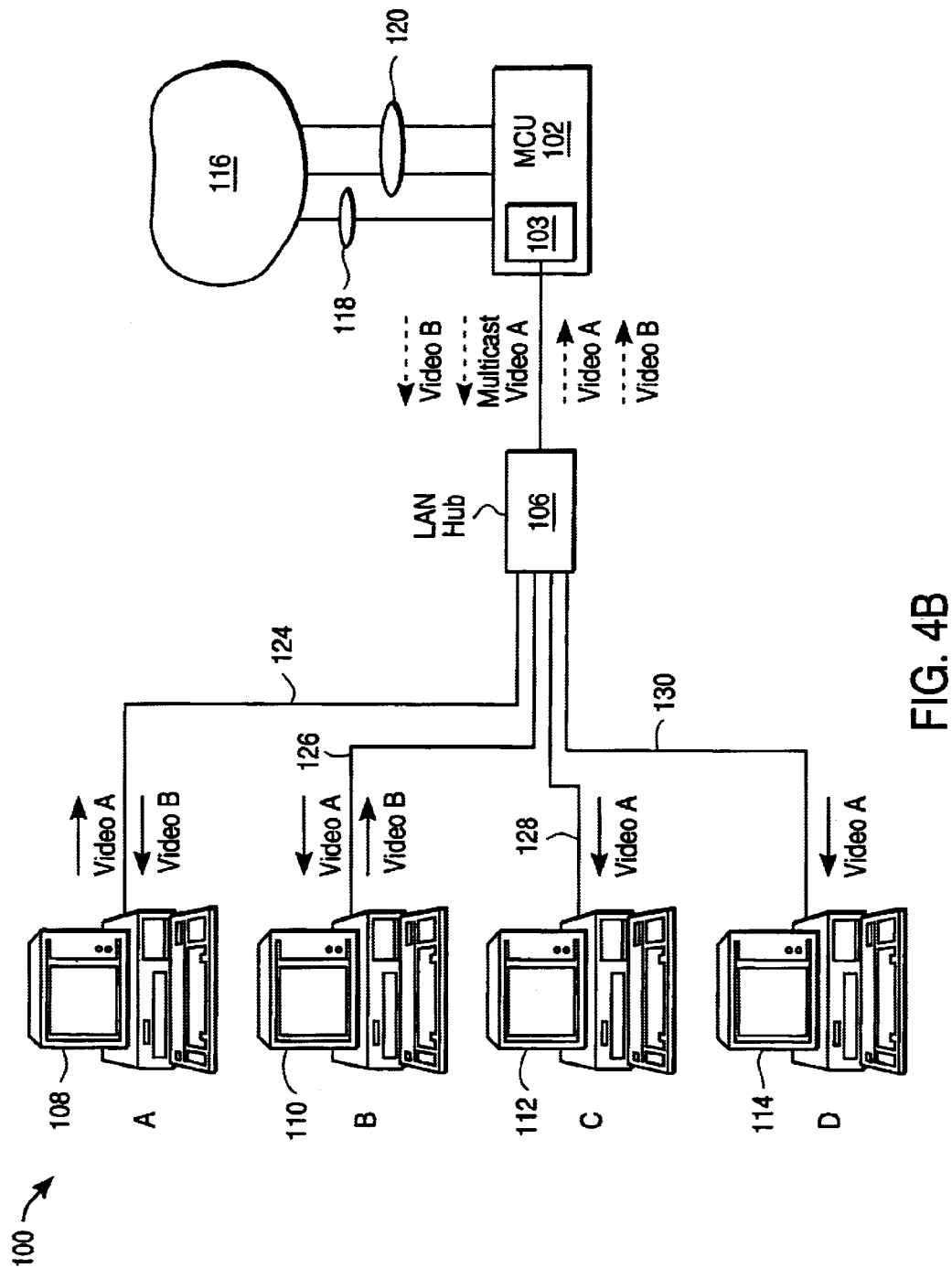
FIG. 4B is a ToL network with multicast streams, in accordance with embodiments of the invention.

If dominant client A wishes to view someone else's presentation, then an additional video stream is opened by MCU 102 between dominant PCS 108 and the selected subordinate client, as shown in FIG. 4B. FIG. 4B therefore shows two additional video streams (dotted line arrows "Video B" between MCU 102 and LAN hub 106) than those shown in FIG. 4A. The specific embodiments of FIG. 4B are similar to the description of the specific embodiments of FIG. 4A. More specifically, FIG. 4B shows embodiments having a MCU with multicast capability and clients without point-to-point connection capability where the dominant client A wishes to see one or more other clients other than himself, such as for example client B (FIG. 4B with all four dotted line arrows). FIG. 4B further shows embodiments having a MCU with multicast capability and clients with point-to-point connection capability where the dominant client A wishes to see one or more other clients other than himself (FIG. 4B omitting all four dotted line arrows).

In the above described embodiments, as the conference progresses, the MCU 102 monitors the audio channels of all clients in the conference and if the dominant client stops talking and another client takes over, the MCU 102 dynamically alters the video packet transmissions based on changes in audio dominance. By way of example, if client A stops talking and client D starts to dominate the talk, the MCU 102 will arrange to have client D send video packets to clients A, B, and C as the dominant video stream. In some embodiments, MCU 102 will instruct the now-subordinate client A to stop transmitting video and instruct the now-dominant client D to start transmitting video, and MCU 102 will re-transmit (either unicast or multicast) video from client D to other subordinate clients. In other embodiments where client point-to-point connection capability exists, MCU 102 will instruct the now-subordinate client A to stop transmitting video and instruct now-dominant client D to start transmitting video to the other now-subordinate clients. In all embodiments, the audio stream remains unchanged and is monitored for changes in client dominance. In any case, the present invention can significantly reduce the digital signal processing required in the MCU by reducing the total amount of video streams between the MCU and the network, with a total of four to six such video streams in the above unicast embodiments and a total of zero to four such video streams in the above multicast embodiments, as discussed in detail above. In addition, the network bandwidth is reduced with the specific embodiments of the present invention.

Figure 5A:
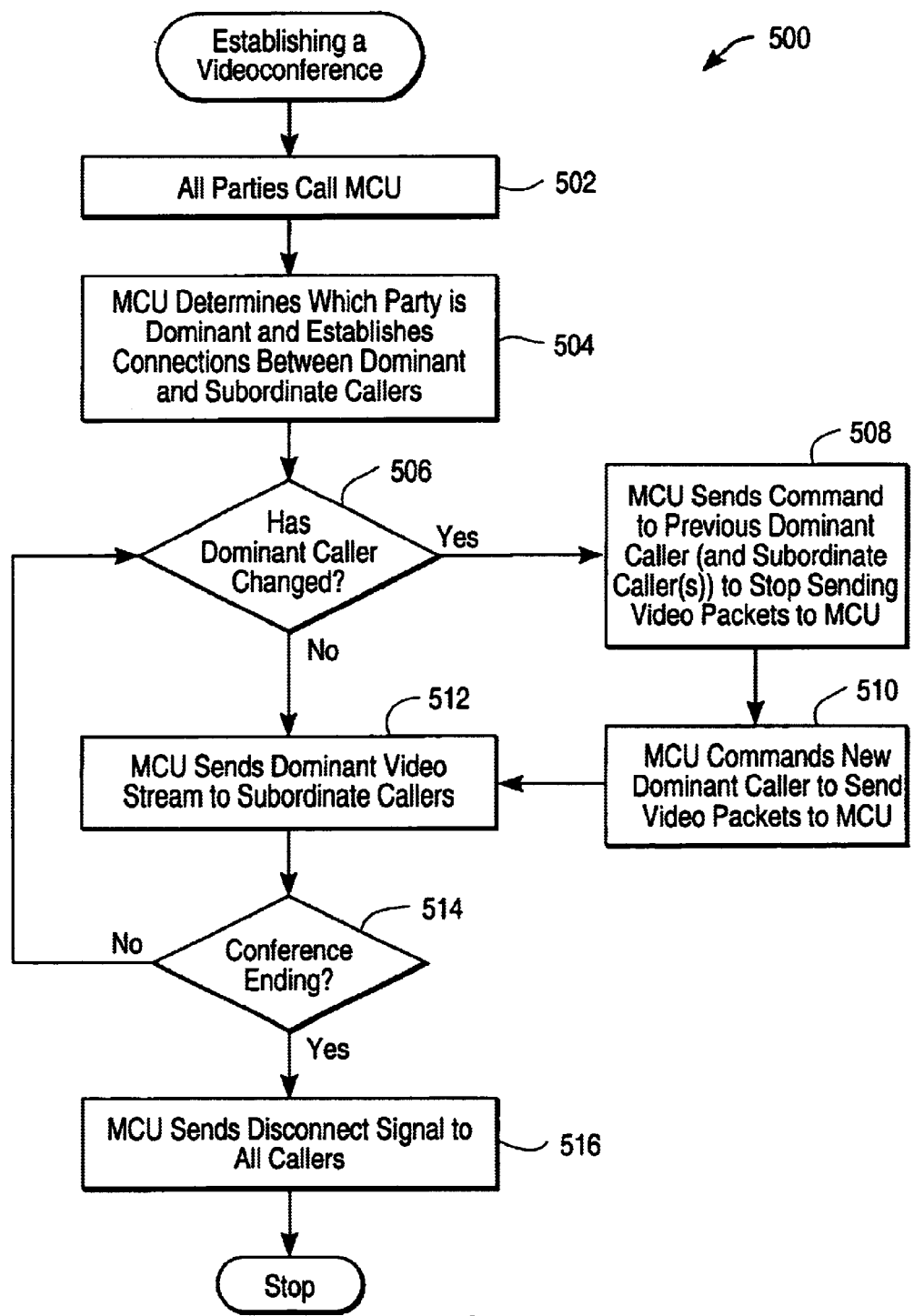
FIG. 5A is a flowchart detailing a process for reducing the video bandwidth required and MCU digital signal processing required to support a multipoint audio-video conference in accordance with embodiments of the invention.

FIG. 5 is a flowchart detailing a process 500 for establishing a videoconference in accordance with specific embodiments of the invention. It should be noted that the process 500 is implemented in some embodiments in the network 100. The process 500 begins at step 502 by all parties involved in the prospective videoconference calling the MCU in order to establish the proper video and audio channels. At step 504, the MCU determines which of the calling parties is the dominant caller. The determination of dominance can be accomplished in many ways, one of which is by simply designating the caller who sends the first call to the MCU as dominant. This is typical of most conference calls since the person requesting the conference call is typically the one making the initial connection. The MCU then determines if there is a new dominant caller and establishes the minimally required video packet streams (as discussed in detail above) based upon that determination at 506. This can occur, for example, if it is determined that the person contacting the MCU first is not the dominant caller as well as during setting up the conference call. This determination can be, in one embodiment, established by the MCU monitoring (e.g., sampling) the audio packet traffic of the users, with the user having the most audio packet traffic being determined to be the dominant user. In another embodiment, the dominant caller can be self-identified as such to the MCU.

If the MCU has determined that the dominant user has changed to a new dominant caller, then the MCU in step 508 sends a command to the previous dominant caller (if any) and any subordinate callers (who may be sending video packets to the dominant caller via the MCU) to stop transmitting video packets to the MCU. In alternative embodiments, the MCU may instruct a subordinate caller to start transmitting video packets to the MCU for transmission to the dominant caller, should the dominant caller desire to view another caller rather than himself. The MCU then sends in step 510 a command to the new dominant caller to start transmitting video packets to the MCU. In either case, the MCU in step 512 sends the dominant video stream, in either a multicast or a unicast mode, to at least the subordinate users. If it is determined in step 514 that the conference call is not ending, then the system proceeds back to step 506 to determine if the dominant caller has changed. If the conference call is ending, the MCU sends a disconnect sequence to all users at 516.

Figure 5B:
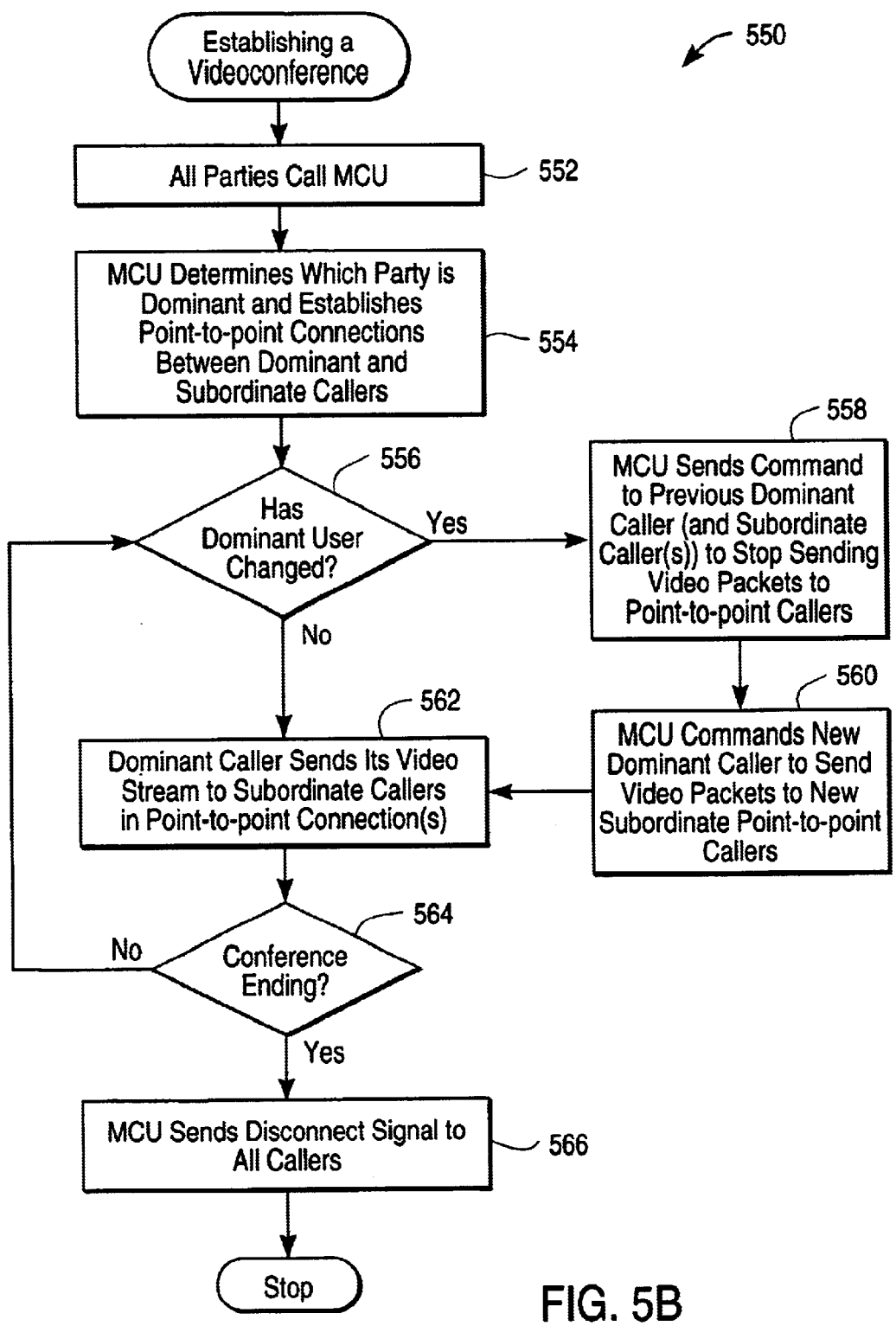
FIG. 5B is a flowchart detailing a process for reducing the video bandwidth required to support a multipoint audio-video conference in accordance with alternative embodiments of the invention.

FIG. 5B is a flowchart detailing a process for reducing the video bandwidth required to support a multipoint audio-video conference in accordance with alternative embodiments of the invention. The process 550 begins at step 552 by all parties involved in the prospective videoconference calling the MCU in order to establish the proper video and audio channels. At step 554, the MCU determines which of the calling parties is the dominant caller. The determination of dominance is accomplished as already discussed above. The MCU then determines in step 556 if there is a new dominant caller and arranges video streams based upon that determination. When the dominant caller is determined, the MCU sends commands to the dominant caller to begin transmitting point-to-point video connections (either unicast or multicast) to at least the subordinate callers and the MCU instructs at least the subordinate callers to being receiving video from the dominant caller. The dominant caller then transmits video to the other callers and/or itself (if no other designated non-dominant caller is sending video to the dominant caller).

If the MCU has determined that the dominant user has changed to a new dominant caller, then the MCU in step 558 sends a command to the previous dominant caller (if any) and any subordinate callers (which may have been sending video to the dominant caller) to stop transmitting video packets via their respective point-to-point connections. In alternative embodiments, the MCU may instruct a subordinate caller to start transmitting video packets to the MCU for transmission to the dominant caller, should the dominant caller desire to view another caller rather than himself. The MCU then sends in step 560 a command to the new dominant caller to start transmitting video packets to at least the now-subordinate callers. In either case, the dominant caller in step 562 sends the dominant video stream, in either a multicast or a unicast mode, to at least the subordinate users. If it is determined in step 564 that the conference call is not ending, then the system proceeds back to step 556 to determine if the dominant caller has changed. If the conference call is ending, the MCU sends a disconnect sequence to all users at 566.

Figure 6:
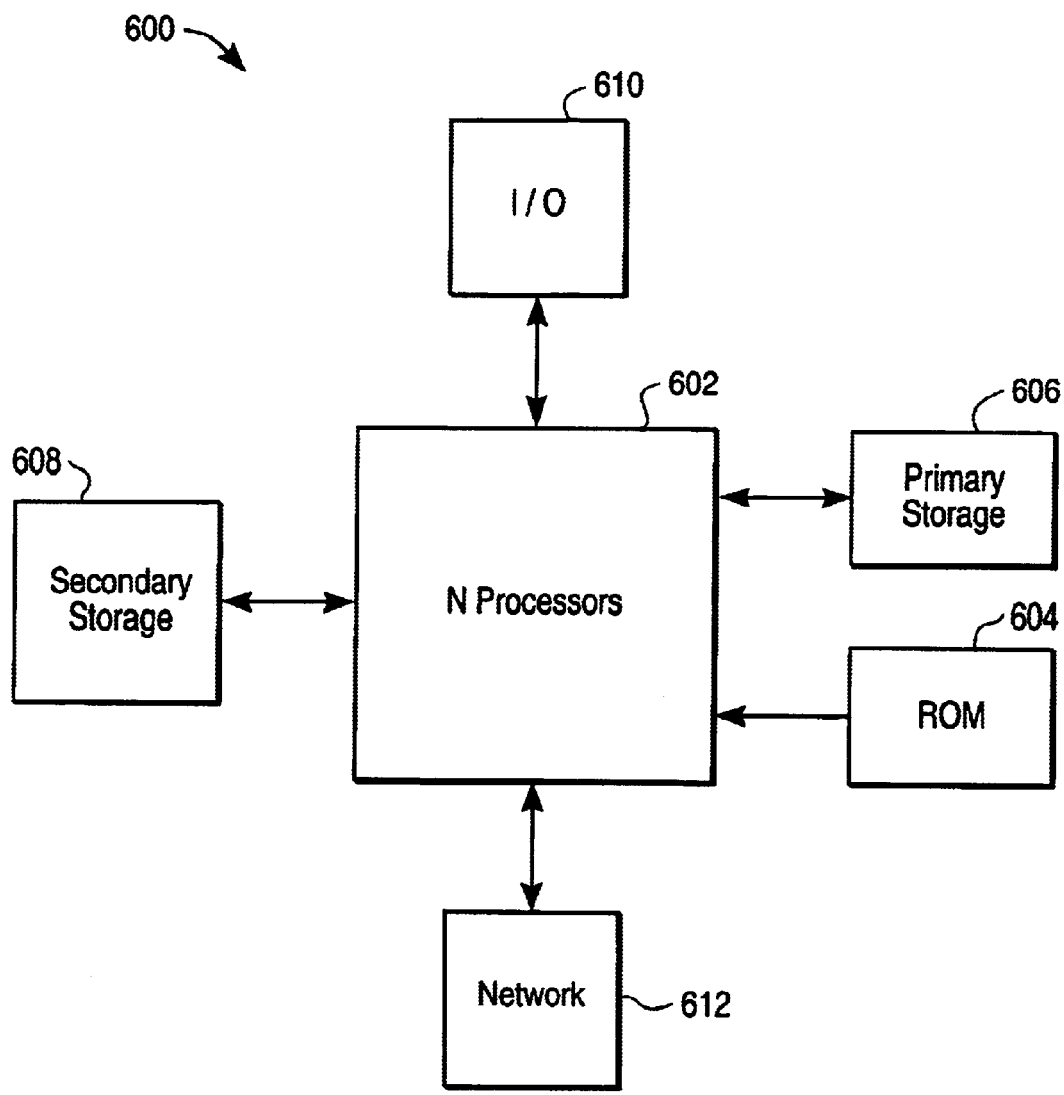
FIG. 6 illustrates a typical, general-purpose computer system suitable for implementing the present invention.

FIG. 6 illustrates a typical, general-purpose computer system 600 suitable for implementing the present invention in the form of a personal communications system. The computer system 600 includes any number of processors 602 (also referred to as central processing units, or CPUs) that are coupled to memory devices including storage devices 604 (typically a read only memory, or ROM) and primary storage devices 606 (typically a random access memory, or RAM). Computer system 600 or, more specifically CPUs 602, may be arranged to support a virtual machine, as will be appreciated by those skilled in the art. As is well known in the art, ROM 604 acts to transfer data and instructions uni-directionally to the CPUs 602, while RAM 606 is used typically to transfer data and instructions in a bi-directional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

While the present invention has been described as being used with a computer system, it should be appreciated that the present invention may generally be implemented on any suitable device capable of digitizing audio and/or video signals. Specifically, the methods of utilizing audio signals to determine a dominant user can be applied to wireless conference systems where reducing the bandwidth is important without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method of establishing a multipoint conference among a plurality of communication units, wherein each of the communication units is coupled to a multimedia conference unit that is capable of arranging connections between each of the plurality of communication units in support of the multipoint conference, wherein the communication units communicate with each other by passing signals over a network via said connections, and wherein said signals include signals in the form of video packets, said method comprising:

determining which of the plurality of communication units is a dominant communication unit, the others of the plurality of communication units being designated as subordinate communication units;
   suppressing a portion of the signals passed over said network by the subordinate communication units; and
   sending video packets directly from the dominant communication unit to at least some subordinate communication units in a multicast mode.

2. A method as recited in claim 1, wherein the determining is performed by the multimedia conference unit based on audio dominance.

3. A method as recited in claim 2, wherein the signals include audio signals and video signals.

4. A method as recited in claim 3, wherein the audio signals take the form of audio packets and the video signals take the form of video packets.

5. A method as recited in claim 1, wherein said network comprises a wireless telephony system.

6. A method of establishing a multipoint conference among a plurality of communication units, wherein each of the communication units is coupled to a multimedia conference unit that is capable of arranging connections between each of the plurality of communication units in support of the multipoint conference, wherein the communication units communicate with each other by passing signals over a network via said connections, said method comprising:

determining which of the plurality of communication units is a dominant communication unit, the others of the plurality of communication units being designated as subordinate communication units; and
   suppressing a portion of the signals passed over said network by the subordinate communication units;
   wherein the determining is performed by the multimedia conference unit based on audio dominance;
   wherein the signals include audio signals and video signals;
   wherein the audio signals take the form of audio packets and the video signals take the form of video packets; and
   sending video packets directly from the dominant communication unit to selected ones of the subordinate communication units in a multicast mode;
   wherein suppressing a portion of the signals comprises: issuing a command by the multimedia conference unit to each of the subordinate communication units to stop sending video packets over said network such that only the dominant communication unit is sending video packets and each of the subordinate communication units is only receiving the dominant communication unit video packets.

7. A method of establishing a multipoint conference among a plurality of communication units, wherein each of the communication units is coupled to a multimedia conference unit that is capable of arranging connections between each of the plurality of communication units in support of the multipoint conference, wherein the communication units communicate with each other by passing signals over a network via said connections, said method comprising:

determining which of the plurality of communication units is a dominant communication unit, the others of the plurality of communication units being designated as subordinate communication units; and
   suppressing a portion of the signals passed over said network by the subordinate communication units;
   wherein the determining is performed by the multimedia conference unit based on audio dominance;
   wherein the signals include audio signals and video signals;
   wherein the audio signals take the form of audio packets and the video signals take the form of video packets; and
   wherein suppressing a portion of the signals comprises issuing a command by the multimedia conference unit to each of the subordinate communication units to stop sending video packets over said network such that only the dominant communication unit is sending video packets and each of the subordinate communication units is only receiving the dominant communication unit video packets;
   the method further comprising sending video packets directly from the dominant communication unit to selected ones of the subordinate communication units in a multicast mode, and sending video packets from a selected subordinate communication unit directly to the dominant communication unit.

8. A method as recited in claim 7 wherein the dominant communication unit is a first communication unit to contact the multimedia conference unit.

9. A method as recited in claim 8 further comprising:

determining if the dominant communication unit has changed from the first one of the communication units to a second one of the communication units;
   commanding the first communication unit to stop sending video signals in the form of video packets; and
   commanding the second communication unit to start sending video signals in the form of video packets.

10. A method as recited in claim 9, wherein said network comprises an H.323 network.

11. A system for conducting a multimedia conference, comprising:

a plurality of personal communication units, wherein each of the personal communication units provides a communication signal;

a multimedia conference unit interconnecting each of the plurality of personal communication units by way of a network, wherein the network carries communication signals provided by at least any one of the plurality of personal communication units;

a selector unit, coupled to the multimedia conference unit, that determines which of the personal communication units in the network represents a dominant communication unit such that the other personal communication units represent subordinate communication units; and wherein the multimedia conference unit directs the subordinate communication units to suppress a portion of their respective communication signals and further directs the dominant communication unit to transmit its corresponding communication signal to each of the subordinate communication units.

12. A system as recited in claim 11, wherein the communication signal takes the form of an audio signal and a video signal, and said portion is said video signal.

13. A system as recited in 12, wherein the audio signal is formed of a plurality of audio packets and wherein the video signal is formed of a plurality of video packets.

14. A system as recited in 13, wherein the personal communication unit is a first personal communication unit to contact the multimedia conference unit.

15. A system as recited in claim 14, wherein when the selector unit has determined a new dominant communication unit, the multimedia conference unit commands the new dominant communication unit to start sending video packets and commands said dominant communication unit to stop sending video packets.

16. A system as recited in claim 15, wherein the system is a telephony-over-local area network (ToL) system and said personal communication unit are computers.

17. A system as recited in claim 16, wherein the system is a wireless telephone system.

18. A system as recited in claim 11, wherein said multimedia conference unit directs the dominant personal communication unit to transmit its corresponding communication signal to at least each of said subordinate communication units via connections to said multimedia conference unit.

19. A system as recited in claim 18, wherein said connections are unicast or multicast connections.

20. A computer program product comprising:

a computer-readable medium;

multimedia conference unit operating instructions embedded in the computer-readable medium, wherein the multimedia conference unit operating instructions determine which one of a plurality of communication units is a dominant communication unit, such that others of the plurality of communication units are subordinate communication units; and wherein the multimedia conference unit operating instructions suppress a portion of communication signals provided by the subordinate communication units by instructing some subordinate communication units to refrain from providing some communications; and wherein the multimedia conference unit operating instructions instruct the dominant communication unit to send video communication signals directly to some subordinate communication units.

21. A multimedia conference unit suitable for interconnecting a plurality of communication units arranged to transmit and receive digitized communication signals over a network including said multimedia conference unit, comprising:

a plurality of input/output ports coupled to said network; and a selector unit coupled to the input/output ports arranged to determine which of the communication units is a dominant communication unit, wherein the the other communication units are deemed to be subordinate communication units, and wherein the selector unit causes the subordinate communication units to suppress their respective transmission of digitized communication signals and to receive from the dominant communication unit, multicast mode, the digitized communication signal transmitted by the dominant communication unit.

* * * * *